United States Patent [19]

Huhle

[11] Patent Number: 4,591,252

[45] Date of Patent: May 27, 1986

[54] PHOTOGRAPHIC GROUND-GLASS PLATE CAMERA

[75] Inventor: Horst Huhle, Munich, Fed. Rep. of Germany

[73] Assignee: Linhof Präzisions-Kamera-Werke GmbH, Fed. Rep. of Germany

[21] Appl. No.: 679,296

[22] Filed: Dec. 7, 1984

[30] Foreign Application Priority Data

Dec. 8, 1983 [DE] Fed. Rep. of Germany ....... 3344362

[51] Int. Cl.$^4$ .............................................. G03B 17/04
[52] U.S. Cl. .................... 354/191; 354/160; 354/189
[58] Field of Search ............. 354/160, 187, 188, 189, 354/190, 191

[56] References Cited

U.S. PATENT DOCUMENTS

| | | | |
|---|---|---|---|
| 2,173,553 | 9/1939 | Graf | 354/188 |
| 2,301,921 | 11/1942 | Willcox | 354/160 |
| 2,619,014 | 11/1952 | Geddes | 354/160 |
| 2,909,974 | 10/1959 | Koch | 354/188 |
| 3,479,945 | 11/1969 | Koch | 354/160 |
| 3,745,903 | 7/1973 | Studley | 354/188 |

Primary Examiner—A. A. Mathews
Attorney, Agent, or Firm—McGlew and Tuttle

[57] ABSTRACT

The image carrier and lens carrier of a photographic ground-glass plate camera are supported on a camera base for lengthwise displacement on separate guide rails, and for pivoting about a vertical axis. A bellows is connected between the carriers. The position of the pivotal axes is selected to make it possible to swing the two carriers through 90° out of their working positions without removing the bellows of the camera, and to thus form a compact unit for transportation and packaging.

6 Claims, 4 Drawing Figures

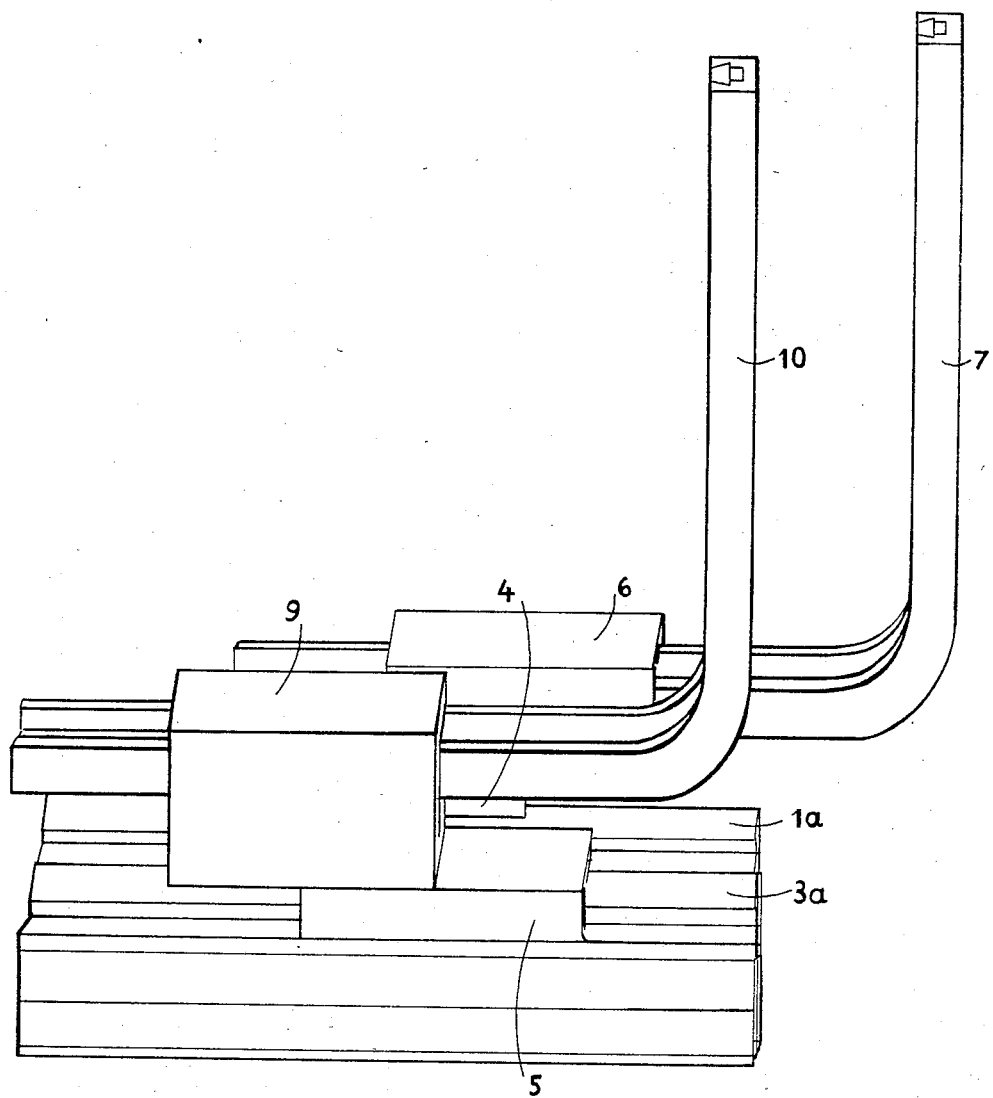

PHOTOGRAPHIC GROUND-GLASS PLATE CAMERA

FIELD AND BACKGROUND OF THE INVENTION

The invention relates to a photographic ground-glass plate camera comprising an image carrier and a lens carrier which both are pivotable about an axis extending vertically in the normal position of use of the camera, and are connected each to a slide, which slides are supported on a camera base for displacement relative to each other in the direction corresponding to the basic position of the lens, of the optical axis.

Cameras of this kind are built on the principle of an optical bench. Lens carrier and image carrier are frequently laterally displaceable in addition, and pivotable about a horizontal axis. They are relatively bulky and therefore employed mostly in studios, even though they are equally well suited for outdoor picture taking.

To be able to accommodate such cameras for transportation in a portable case, the camera base is frequently made extensible. Lens carrier and image carrier are turned through 90°, thus brought into a position parallel to the camera base, so that a flat form is obtained suitable for accommodation in a case. With prior art cameras, however, this is possible only upon removing the bellows and displacing the image carrier and lens carrier toward each other until they extend side by side in their turned positions. This requires an elongated, unhandy suitcase.

SUMMARY OF THE INVENTION

The present invention is directed to a camera of the above-mentioned kind which, for purposes of transportation and packaging, can be brought into a flat, very compact form without having to loosen or remove any part, such as the bellows.

This is obtained by providing that the camera base comprises separate guide rails for the image carrier and the lens carrier, with the two guide rails extending parallel to each other while being spaced from each other by a certain distance, and that the axes for pivoting the carriers relative to the slides extend in a manner such that, considered in the guide rail plane, their distance from each other in the direction of the guide rail extension is larger than or equal to their distance perpendicular thereto.

With a camera of this design, the two carriers can be turned through 90° by means of a handle conjointly, without the necessity of disconnecting the bellows therefrom, so that they extend one after the other and both parallel to the camera base. While providing the camera base with features known per se, the camera in folded state is not only very flat but even its length does not exceed the width of the carrier.

BRIEF DESCRIPTION OF THE DRAWINGS

In the following, one embodiment of the invention is described with reference to the drawings, where only the parts substantial for understanding the invention are shown. In the drawings:

FIG. 4 is a perspective view of the camera in its position for transportation, again with the carrier removed.

DESCRIPTION OF THE PREFERRED EMBODIMENT

Figure 1:
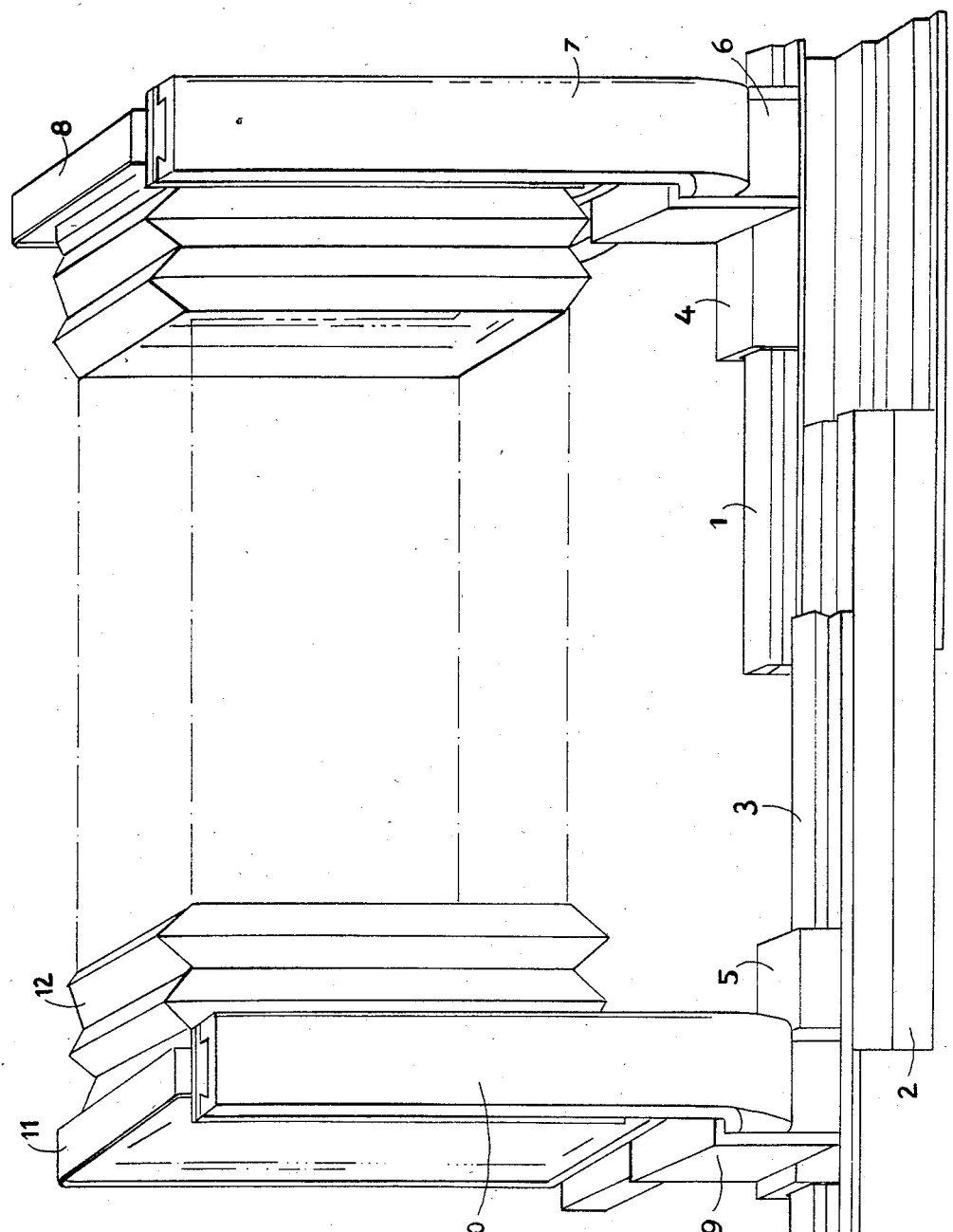
FIG. 1 is a perspective side view of the camera in working position.
Figure 2:
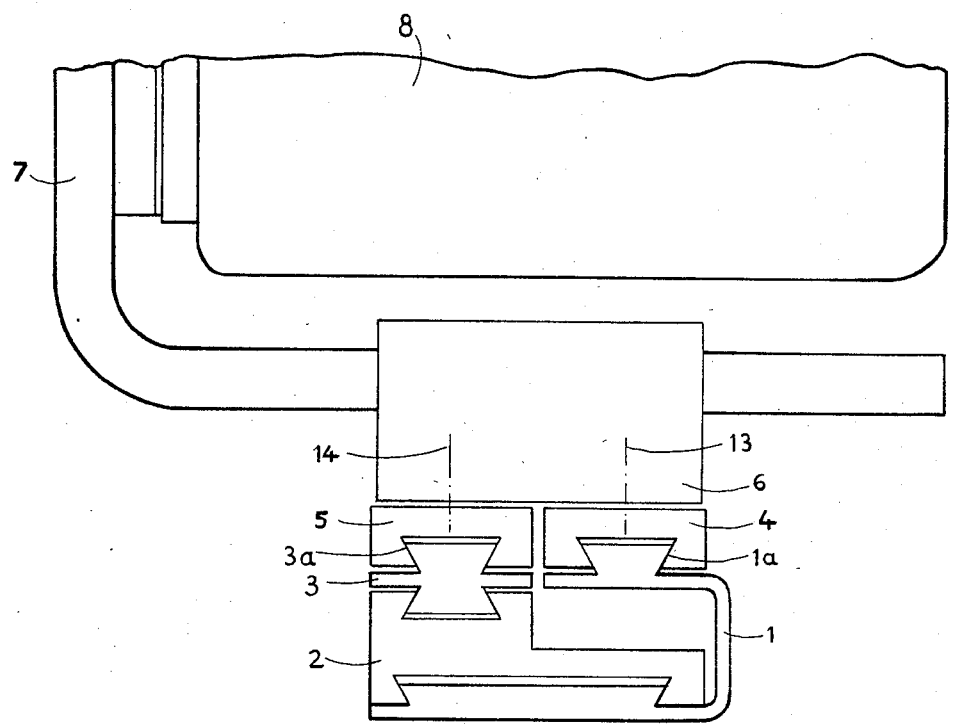
FIG. 2 is a rear view of the camera base and the lower portion of the rear part in working position.

The camera base is assembled of three sectional parts 1, 2 and 3 which are engaged with one another along dovetail guides and are displaceable relative to each other. Arresting of the sectional plate in any relative position is possible by means of clamping mechanisms (not shown).

On the top of sectional parts 1 and 3, at the same level, a dovetail guide rail 1a; 3a respectively is formed. These rails engage a respective slide 4 and 5 which may be displaced by means of a rack and pinion drive. Neither the drive nor clamping elements which may be provided are shown.

Slide 4 is connected through a pivotal connection having a vertical axis 13, to a standard comprising a base 6 and an L-bracket 7. Bracket 7 may be laterally displaceable relative to base 6. To the vertical leg of bracket 7, an image carrier 8 is secured through a vertical shifting mechanism. Carrier 8 supports a glass plate for receiving an image.

Slide 5, in a similar arrangement, supports the lens carrier 11 through a standard 9 which is pivoted about a vertical axis 14.

Figure 3:
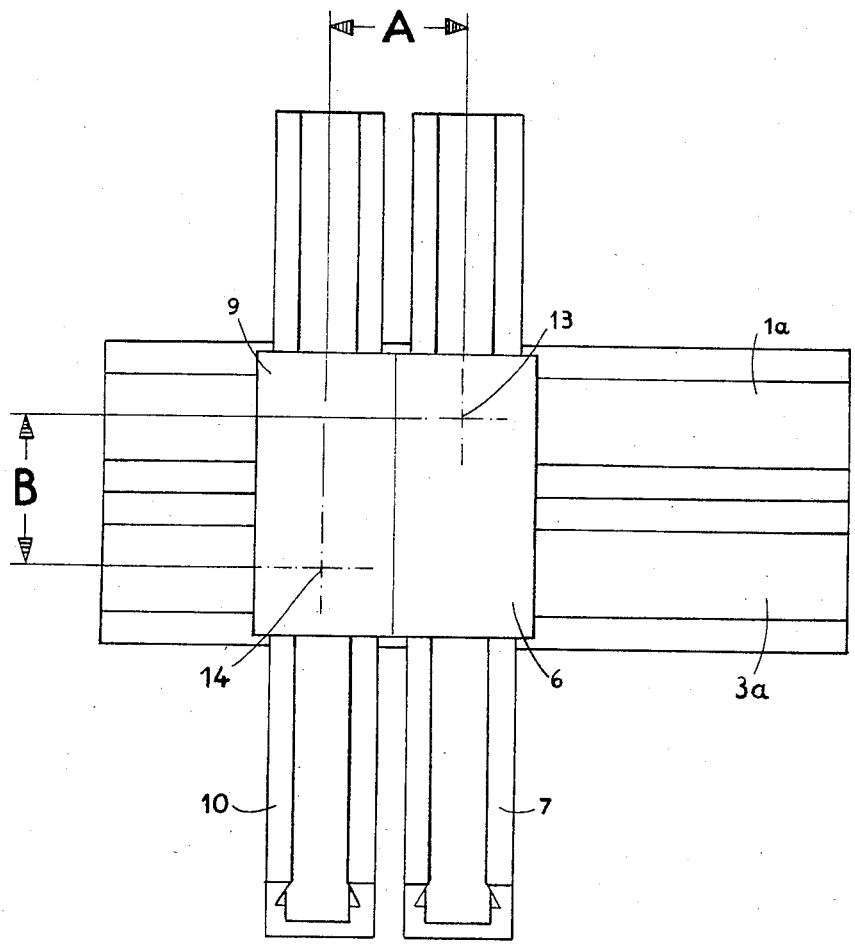
FIG. 3 is a diagrammatical top plan view of the camera in its working position, but with the lens and plate carriers removed.

FIG. 3 shows the position of the vertical pivotal axes 13 and 14. They extend above the associated guide rails 1a, 3a. The distance A (for closest approach of the bases 6, 9) is larger than or equal to the distance B (between the rails). The optimum relation is A=B. Upon pivoting the standards and the carriers supported thereby from their positions shown in FIG. 3 simultaneously counterclockwise, the positions of FIG. 4 are reached, with the modification that due to the returning force exerted during the pivoting by bellows 12, which is not shown in this figure, the two carriers are laterally displaced along guide rails 1a, 3a so that the two brackets 7 and 10 come into positions aligned with each other. In other words, since the bases 6 and 9 can slide with respect to each other through slides 4 and 5 which are slidably mounted on rails 1a and 3a, when the bases 6 and 9 are pivoted in a counterclockwise direction about their respective axes 13 and 14, slides 4 and 5 will simultaneously slide on their respective rail to maintain an alignment between the carriers 8 and 11, and the bellows 12 connected between the carriers.

I claim:

1. A photographic camera comprising a camera base defining two parallel spaced apart guide rails for defining two slide paths which are spaced apart by a rail distance, an image carrier slide slidably mounted to one of said guide rails for sliding along one of said slide paths, a lens carrier slide slidably mounted to the other of said guide rails for sliding along the other of said slide paths, an image carrier standard pivotally mounted to said image carrier slide about a first axis extending perpendicularly to said one slide path and intersecting said one slide path, and a lens carrier standard pivotally mounted to said lens carrier slide about a second axis which is perpendicular to said other slide path and intersects said other slide path, said image carrier and lens carrier standards being movable on said slide paths to a spaced apart use position and movable toward each other to an adjacent storage position, said first and second axes being spaced apart by a slide path distance parallel to said slide paths which is at least equal to said rail distance between said slide paths when said standards are in their adjacent storage position.

2. A camera according to claim 1, wherein said camera base comprises at least two camera base parts which are slidably mounted to each other in a direction parallel to said slide paths, each of said camera base parts carrying one of said guide rails.

3. A camera according to claim 2, wherein each of said guide rails comprises a dovetail guide rail, each of said slides having a dovetail groove for receiving one of said dovetail guide rails.

4. A camera according to claim 2, wherein said image carrier standard comprises an image carrier base pivotally mounted about said first axis to said one slide, said lens carrier standard comprising a lens carrier base pivotally mounted to said other slide about said second axis, a first L-shaped bracket having one leg connected to said image carrier base and an image carrier connected to another leg of said L-shaped bracket, and a second L-shaped bracket having one leg connected to said lens carrier base and a lens carrier connected to another leg of said second L-shaped bracket.

5. A camera according to claim 4, including a bellows connected between said image carrier and said lens carrier, said image and lens carriers each lying in its own plane, with said plane being parallel to each other at all points between said use position and said storage position for said standard.

6. A camera according to claim 1, including a bellows connected between said image carrier standard and said lens carrier standard, said bellows being contractible when said standards move from their use position to their storage position.

* * * * *